United States Patent [19]
Shirasaki et al.

[11] Patent Number: 5,909,522
[45] Date of Patent: Jun. 1, 1999

[54] CHIRPED WAVEGUIDE GRATING ROUTER WITH FOCAL LENGTH ADJUSTMENT

[75] Inventors: Masataka Shirasaki, Winchester, Mass.; Christopher Richard Doerr, Atlantic Highlands, N.J.

[73] Assignee: Lucent Technologies Inc., Murray Hill, N.J.

[21] Appl. No.: 08/797,365

[22] Filed: Feb. 7, 1997

[51] Int. Cl.⁶ .................................................. G02B 6/28
[52] U.S. Cl. .............................. 385/24; 385/37; 385/46
[58] Field of Search ................................. 385/24, 11, 30, 385/14, 31, 37, 39, 46, 20, 41; 359/127, 129, 130

[56] References Cited

U.S. PATENT DOCUMENTS

| 5,136,671 | 8/1992 | Dragone | 385/46 |
| 5,341,444 | 8/1994 | Henry et al. | 385/11 |
| 5,636,300 | 6/1997 | Keck et al. | 385/24 |

OTHER PUBLICATIONS

"Chirping of the Waveguide Grating Router for Free–Spectral–Range Mode Selection in the Multifrequency Laser", C. R. Doerr, et al., IEEE Photonics Tech. Ltrs, vol. 8, Apr. '96, pp. 500–502.

*Primary Examiner*—Phan T. H. Palmer
*Attorney, Agent, or Firm*—Jeffery J. Brosemer

[57] ABSTRACT

An improved waveguide grating router enhances the transmissivity of a dominant passband selected from a plurality of passbands. The router includes a first waveguide coupler, a second waveguide coupler, and a plurality of M waveguides coupled between the first and second waveguide couplers. Each waveguide m has a length L(m). The difference in length ($\Delta L$) between any two adjacent waveguides, m and (m−1), is equal to an arbitrary constant plus (A*m) for each of the waveguides. Mathematically, this may be expressed as $\Delta L=\{L(m)-L(m-1)\}=k+A*(m)$, where k is an arbitrary constant, m denotes a given waveguide out of a total M waveguides, and A is a positive or negative real number. In this manner, the difference in length $\Delta L$ between adjacent waveguide arms is a monotonically increasing or decreasing function of m; i.e., a parabolic function of m. The focal lengths of the second waveguide coupler are related to A, thereby enhancing the transmissivity of a dominant passband selected from a plurality of passbands.

5 Claims, 3 Drawing Sheets

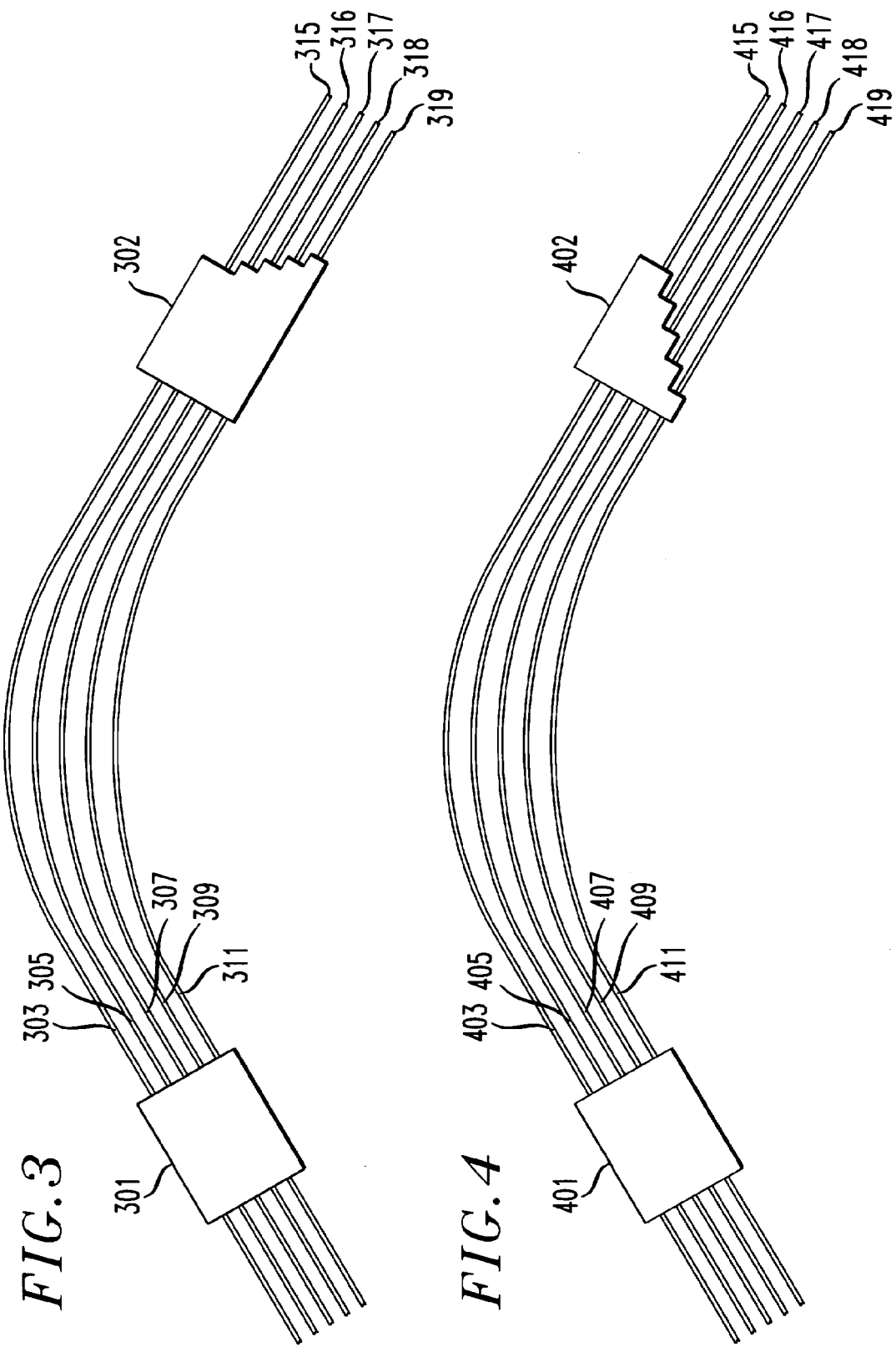

CHIRPED WAVEGUIDE GRATING ROUTER WITH FOCAL LENGTH ADJUSTMENT

CROSS-REFERENCE TO RELATED APPLICATIONS

This application relates to U.S. application Ser. No. 08/580,951, filed Dec. 29, 1995, and allowed on Sep. 30, 1996, and also to U.S. patent application Ser. No. 08/800,946, filed on Feb. 14, 1997 and allowed on Apr. 14, 1998 and now U.S. Pat. No. 5,845,022.

BACKGROUND OF THE INVENTION

1. Field of the Invention

This invention relates generally to optical transmission, and more specifically to techniques for controlling optical signals in waveguide grating routers.

2. Background of Related Art

Waveguide grating routers have been employed in the field of optical transmission. One example of a waveguide grating router is disclosed in U.S. Pat. No. 5,136,671 (the '671 patent), issued to C. Dragone, and incorporated by reference herein. The waveguide grating router disclosed in the '671 patent is a planar device with $N_1$ inputs and $N_2$ outputs arranged in the form of M grated waveguides (i.e. "arms") of varying lengths L(m), connected between two waveguide couplers. The router includes a set of ports p at a first end of the router and a set of ports q at a second end of the router. The router functions as a filter for each input-output (p-q) combination. If the q ports are terminated with an array of N amplifiers and mirrors, and the p ports are terminated with mirrors and optical amplifiers, a multi-frequency laser (MFL) oscillating at N precisely-spaced frequencies is obtained.

In state-of-the-art waveguide grating router designs, the difference in length (ΔL) between any two adjacent waveguides is constant for all waveguides. Mathematically, this may be expressed as $\Delta L = \{L(m) - L(m-1)\} = k$, where k is a constant. In other words, the length L(m) of a particular waveguide (arm) m, is equal to a constant k plus the length of an adjacent arm m−1, denoted as (L(m−1)). The length of the shortest arm, represented by m=1, is a design parameter that is selected in accordance with the desired physical dimensions of the waveguide grating router.

The frequency spectrum of existing waveguide grating routers presents some shortcomings. Within the frequency passband of each channel, a plurality of evenly-spaced frequency components, each at roughly the same peak power level, will occur. The spacing of these frequency components is determined by the router's free-spectral range. For the MFL, in some of the channels, the net power gain may be nearly the same for two or more of these frequency components, especially if the optical amplifiers connected to the MFL router all have substantially similar characteristics. This repetition of the same signal at several different frequencies within the passband of each channel results in multimode lasing of an optical laser, producing instabilities in the laser's output.

A waveguide grating router having a dominant passband (i.e. one predominant frequency component) is therefore highly desirable. In addition, it is desirable to control the particular frequency or passband at which the peak signal occurs within each channel. Note that, as used herein, the term "frequency" may denote a signal having a single frequency, or a signal occupying a given range of frequencies, i.e., a signal passband.

SUMMARY OF THE INVENTION

An improved waveguide grating router enhances the transmissivity of a dominant passband selected from a plurality of passbands by utilizing a plurality of waveguide arms where the length of the waveguide arms is a monotonically increasing or decreasing function of m, and where the focal lengths of waveguide coupler ports are adjusted to enhance the transmissivity of a dominant passband selected from a plurality of passbands. The router includes a first waveguide coupler, a second waveguide coupler, and a plurality of M waveguides coupled between the first and second waveguide couplers. Each waveguide m has a length L(m). The difference in length (ΔL) between any two adjacent waveguides, m and (m−1), is equal to an arbitrary constant plus (A*m) for each of the waveguides. Mathematically, this may be expressed as $\Delta L = \{L(m) - L(m-1)\} = k + A*(m)$, where k is an arbitrary constant, m denotes a given waveguide out of a total M waveguides, and A is a positive or negative real number.

BRIEF DESCRIPTION OF THE DRAWINGS

The invention, together with its various features and advantages can be readily understood from the following more detailed description taken in conjunction with the accompanying drawings in which.

FIG. 3 illustrates a waveguide grating router constructed in accordance with a second embodiment of the invention wherein the focal lengths of the ports of the second waveguide coupler are selected so as to enhance a specified dominant passband.

FIG. 4 illustrates a waveguide grating router constructed in accordance with a third embodiment of the invention wherein the focal lengths of the ports of the second waveguide coupler are selected so as to enhance a specified dominant passband.

DETAILED DESCRIPTION

Figure 1:
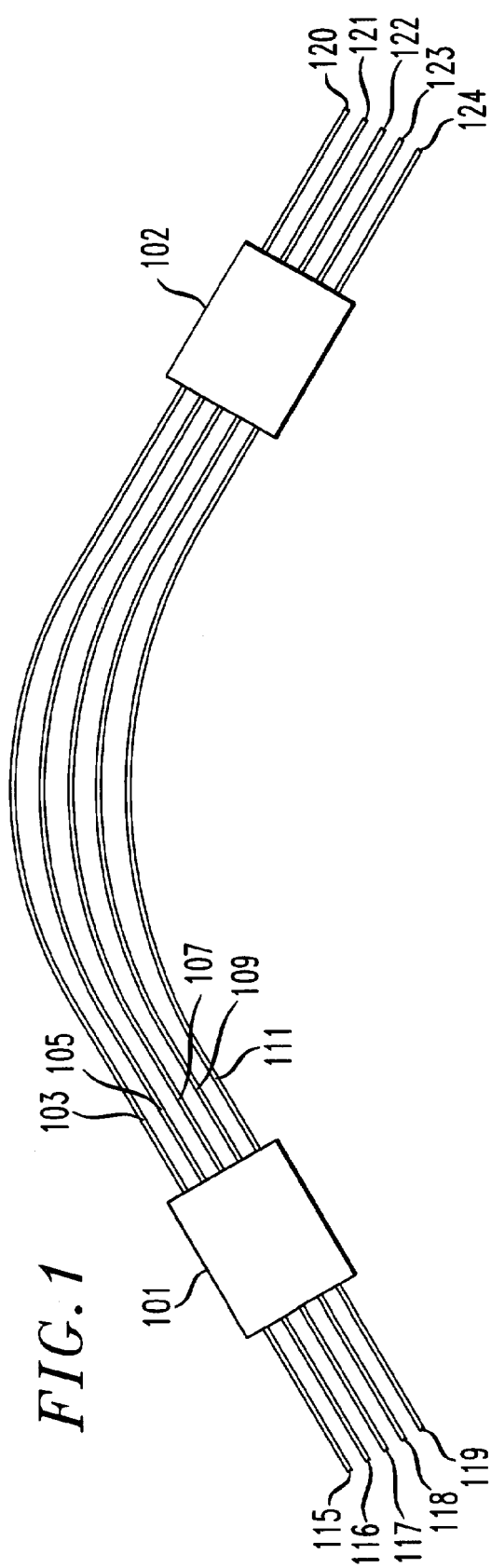
FIG. 1 illustrates a waveguide grating router constructed in accordance with a first embodiment of the invention wherein the length differences of each of a plurality of respective waveguides are determined in accordance with a monotonically-increasing function.

Refer to FIG. 1, which shows a first waveguide coupler 101 and a second waveguide coupler 102 that are used in a waveguide grating router. The waveguide grating router includes a plurality of waveguide grating arms 103, 105, 107, 109, 111 coupled between the first waveguide coupler 101 and the second waveguide coupler 102. A plurality of input ports 115, 116, 117, 118, 119, are coupled to the first waveguide coupler 101, and a plurality of output ports 120, 121, 122, 123, 124 are coupled to the second waveguide coupler 102.

The input and output port (115–124) terminations in couplers 101 and 102 are usually placed on a circular arc of radius R, in coupler 101 and $R_2$ in coupler 102, the center of the arcs near the waveguide grating arms (103, 105, 107, 109, and 111) terminations in the couplers. Likewise, the grating arm terminations are usually placed on a circular arc of radius $R_1$ in coupler 101 and $R_2$ in coupler 102, the centers of the arcs near the input and output terminations in the couplers. These arrangements are equivalent to placing lenses of focal lengths $R_1$ and $R_2$ in couplers 101 and 102, respectively. The number of waveguide grating arms, denoted by M, is generally assumed to be much greater than 1. The waveguide couplers 101, 102 each have a propagation constant, k, and the M waveguide grating arms 103, 105, 107, 109, 111 each have a propagation constant β. The mth waveguide grating arm 107 has a length represented by L(m) and entering the free-space region of waveguide coupler i 102 at an angle denoted by $α_i(m)$. The waveguide couplers 101, 102 may be fabricated, for example, by positioning the waveguide grating arms 103, 105, 107, 109, 111 so that they radiate outwards perpendicular to an imaginary circular arc positioned near the edge of the waveguide coupler 101, 102.

If the lengths of the waveguide grating arms 103, 105, 107, 109, 111 are substantially identical, or if there is a constant difference between the lengths of each pair of adjacent waveguide grating arms, this is referred to as a nonchirped waveguide grating router. For such a nonchirped router, L(m)=mΔL+constant, and $α_i(m)$=[m−(M+1)/2]Δα$_1$, where ΔL and Δα$_1$ are designer-chosen constants. In such a case, the phase front of the lightwave at the end of the grating arms tilts linearly with β. Every time the phase front goes through a tilt of 2π, the transmissivity transfer function for each port repeats. This situation may be visualized with reference to a modified version of FIG. 2, where each of the spectral outputs 201–213 have substantially the same amplitude. However, for purposes of the present application, only one dominant passband per input-output port combination is desired, depicted, for example, as one of the passbands in the set of passbands 215 of FIG. 2.

Unwanted passbands may be suppressed with respect to dominant set of passbands 215 (FIG. 2) by providing specified length differences between the various waveguide grating arms 103, 105, 107, 109, 111 (FIG. 1) according to any predetermined mathematical function other than a constant that provides monotonically increasing or decreasing waveguide length differences. One illustrative example of such a mathematical relationship applies a parabolic function to the length differences among each of a plurality of waveguide grating arms. The difference in length (ΔL) between any two adjacent waveguides, m and (m−1), is equal to an arbitrary constant plus (A*m) for each of the waveguides. Mathematically, this may be expressed as ΔL={L(m)−L(m−1)}=k+A*(m), where k is an arbitrary constant, m denotes a given waveguide out of a total M waveguides, and A is a positive or negative real number. In this manner, the difference in length ΔL between adjacent waveguide arms is a monotonically increasing or decreasing function of m; i.e., a parabolic function of m.

A more specific mathematical relationship for providing parabolic chirp of the waveguide grating arms is given as:

$$L(m) = \text{round}\left\{\left[m + \gamma\left(\frac{m - \frac{M+1}{2}}{1 - \frac{M+1}{2}}\right)^2\right]\Delta L\frac{\beta_c}{2\pi}\right\}\frac{2\pi}{\beta_c} + \text{constant} \quad (1)$$

In the above equation, γ represents a constant whose value determines the amount of chirp. The dominant passbands are centered at β=β$_c$, with grating order ΔLβ$_c$/(2π). Neglecting overall phase shift, the phase shift upon passing through a 1-dimensional thin lens of focal length f is −kx²/(2f), where x is the dimension along the lens. The phase shift encountered in the grating arms is βL(m). If the β term is expanded to equal (β$_c$+Δβ), then the parabolic chirp is equivalent to placing a lens of focal length $$f_c = \frac{-k\left[R\Delta\alpha\left(1 - \frac{M+1}{2}\right)\right]^2}{2\gamma\Delta\beta\Delta L} \quad (2)$$

next to the waveguide grating arms 103, 105, 107, 109, 111.

The overall focal length f of two thin lenses of focal lengths $f_1$ and $f_2$ placed next to one another is given by (1/f)=(1/$f_1$)+(1/$f_2$). This mathematical expression is generally known as the lens maker's formula. Thus, the overall focal length of the grating arms is (1/f)=(1/R)+(1/$f_c$). Defining f=R+d, where d is the offset of the focus from R, then $$d = R2\gamma\Delta\beta\Delta\frac{L}{kR\left[\Delta\alpha\left(1 - \frac{M+1}{2}\right)\right]^2 - 2\gamma\Delta\beta\Delta L} = \quad (3)$$

$$RR\frac{\gamma\theta}{\Delta\alpha\left(1 - \frac{M+1}{2}\right)^2 - 2\gamma\theta}$$

where the second equals sign holds true for the ΔLβ$_c$/(2π) grating order. θ is the input/output port angle where the light is focused, given by θ=ΔβΔL(kRΔα).

The effect of applying parabolic chirp to the arm lengths is now readily apparent. The focal length of the lightwave in the coupler from the arms changes with wavelength. For a standard coupler, this implies that the lightwave is in focus for β=β$_c$. The wave is gradually defocused as β departs from the value, β$_c$. However, if the entrance location of each port waveguide is adjusted radially so as to be in focus, essentially nonchirped performance is achieved for one grating order, along with strong defocusing for other grating orders.

Figure 2:
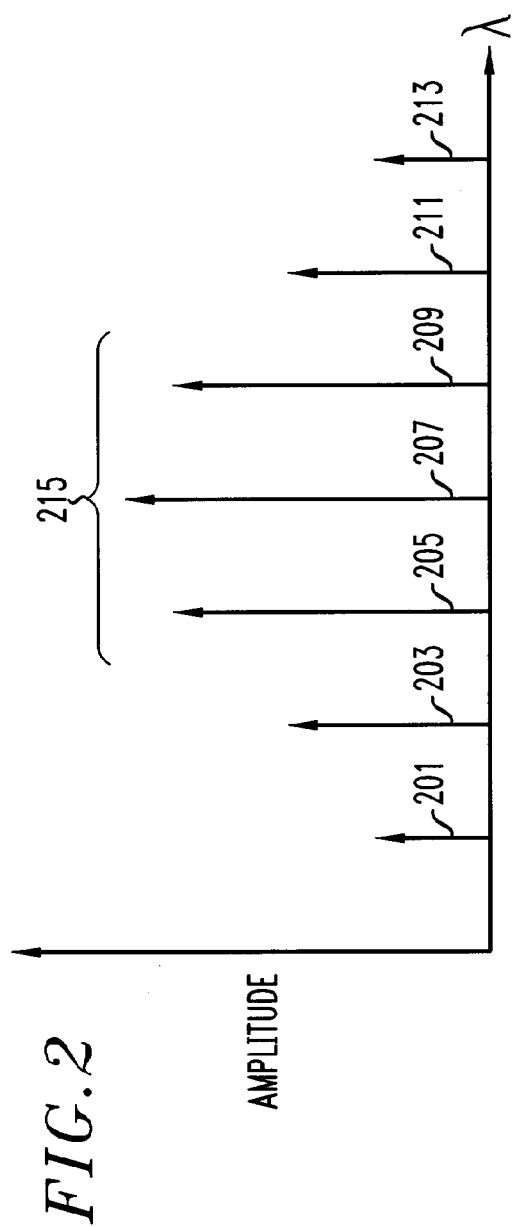
FIG. 2 shows an illustrative spectral output plot for the waveguide grating router of FIG. 1.

The performance of an illustrative waveguide grating router with parabolically-chirped arm lengths without any focal length adjustment is shown in FIG. 2. FIG. 2 may represent, for example, the frequency response of the waveguide grating router shown in FIG. 1. With reference to FIG. 2, frequency components 201, 203, 205, 207, 209, 211, and 213 from a plurality of grating orders are present. However, frequency components 205, 207, and 209, representing a desired dominant passband 215, are present at relatively high amplitudes compared to undesired frequency components 201, 203, 211, and 213.

One shortcoming of chirping only the arm lengths, while maintaining a constant focal length, is apparent upon consideration of FIG. 2. The peak transmissivities of the desired passbands and the extinction ratios to the undesired passbands are decreased for all the input-output port sets except one, passband 207. Also, although the undesired frequency components 201, 203, 211, and 213 are present at lower levels than the components of the dominant passband 215, it would nevertheless be desirable to further reduce the amplitudes of the undesired frequency components 201, 203, 211, 213.

FIG. 3 is a further embodiment of the invention which shows a waveguide grating router wherein the focal length of each of a plurality of ports is adjusted to enhance dominant passband 215 (FIG. 2). As a given port 315 (FIG. 3) waveguide is moved radially, its width may be adjusted to maximize second waveguide coupler 302 transmissivity. Note that the distance between waveguide 303 and port 315 is relatively short as viewed across second waveguide coupler 302, whereas the distance between waveguide 311 and port 319 is relatively long as viewed across second waveguide coupler 302. The distances between other waveguide-port pairs are intermediate with respect to the aforementioned long and short distances. Although FIG. 3 shows a second waveguide coupler 302 having a stepped configuration so as to provide a plurality of distances between waveguides and ports, thereby focusing each port with respect to a particular desired set of passbands, use of a stepped waveguide coupler structure is not required to achieve this result. For example, the stepped surface of coupler 302 could be replaced with a continuously curving surface. First waveguide coupler 301 may be substantially identical to waveguide coupler 101 of FIG. 1. In general, the amplitude transmissivity of a waveguide port 115 excited at an angle $\theta_1$ is free-space-offset radially by $d_1$, and a waveguide port 116 excited at an angle $\theta_2$ in free-space is offset radially by $d_2$ according to the relationship $$t(\theta_1, \theta_2) = \sum_{m=1}^{M} a_1(m, \theta_1) a_2(m, \theta_2) \qquad (4)$$

$$\exp\left\{j\left\{\beta L(m) - kR_1\alpha_1(m)\left\{\theta_1 + \frac{d_1(\theta_1)\alpha_1(m)}{2[R_1 + d_1(\theta_1)]}\right\} - kR_2\alpha_2(m)\left\{\theta_1 + \frac{d_2(\theta_2)\alpha_2(m)}{2[R_2 + d_2(\theta_2)]}\right\}\right\}\right\}$$

where, adding to the work of Dragone in [6] the possibility of waveguides offset from two circles each containing the center of the other, $$a_i(m, \theta) = \frac{\left|\left\{\int_{-\infty}^{\infty} u_i(\theta_i, x)\exp\left[jkxR_i\frac{\alpha_i(m)}{R_i + d_i(\theta_i)}\right]dx\right\}\left\{\int_{-\infty}^{\infty} v_i(m, x)\exp\left\{jkx\left[\theta_i + \frac{d_i(\theta_i)\alpha_i(m)}{R_i + d_i(\theta_i)}\right]\right\}dx\right\}\right|}{\sqrt{\frac{2\pi[R_i + d_i(\theta_i)]}{k}}\left[\int_{-\infty}^{\infty}|u_i(\theta_i, x)|^2\right]\left[\int_{-\infty}^{\infty}|v_i(m, x)|^2 dx\right]} \qquad (5)$$

for $\alpha, \theta \ll 1$. $u_i$ is the field produced at the free-space end of a port waveguide by exciting the port at $\theta_i$, and $v_i$ is the field produced at the free-space end of a grating arm by exciting grating arm m.

Referring now to FIG. 3, coupler 302 has been fabricated such that the focal lengths of output ports 315, 316, 317, 318, and 319 enhances a dominant passband for each output port, while at the same time decreasing the amplitudes of unwanted frequency components. In the example of FIG. 3, the variable ($\gamma$) of Equation 2, determining the extent of the parabolic chirp applied to the lengths of the waveguide grating arms 303, 305, 307, 309, 311 has been assigned a value less than zero. If $\gamma$, in the specific example given above or, equivalently, if A in the general example given above, is less than zero, the second waveguide coupler 302 provides a relatively short focal length for output port 315, a relatively long focal length for output port 319, and intermediate focal lengths for ports 316, 317, and 318.

Figure 5:
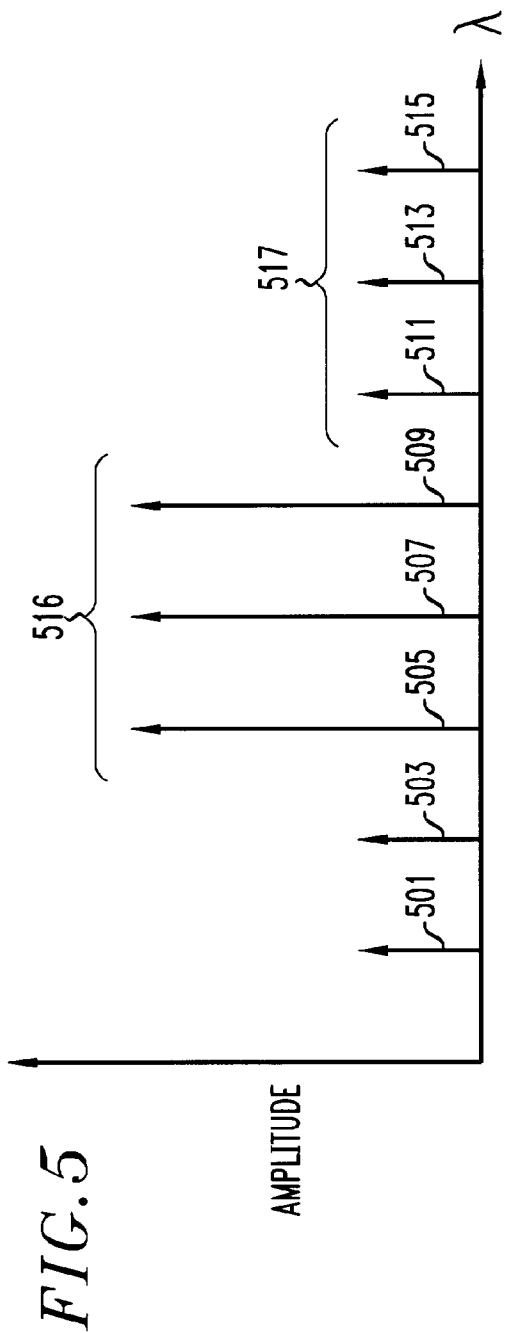
FIG. 5 shows an illustrative spectral output plot for the waveguide grating routers of FIGS. 3 and 4.

An illustrative example of the output signal present on an output port 315 is shown in FIG. 5. Note that the amplitudes of the desired frequency components 505, 507, 509 in dominant passband 516 are substantially higher than the amplitudes of undesired frequency components 511, 513, 515, 501, and 503. Moreover, the amplitudes of the desired frequency components 505, 507, and 509 are relatively uniform. Compare FIG. 5 to FIG. 2, where the amplitudes of the desired frequency components 205, 207, 209 are less uniform, and the ratio between the desired and undesired frequency components 201, 203, 211, 213 is not as great. In this manner, the waveguide grating router of FIG. 3 provides an enhanced structure having improved passband extinction ratio and enhanced transmissivity of the dominant passband.

FIG. 4 is an embodiment of the invention which shows a waveguide grating router having a plurality of waveguide grating arms 403, 405, 407, 409, 411, a first waveguide coupler 401 and a second waveguide coupler 402. The focal length of each of a plurality of ports is adjusted to enhance dominant set of passbands 215 (FIG. 2). As in the case of FIG. 3, as a given port 415 (FIG. 4) waveguide is moved radially, its width may be adjusted to maximize second waveguide coupler 402 transmissivity. As in the case of FIG. 3, the stepped surface of coupler 402 is shown for illustrative purposes. This surface could alternatively, for example, be continuously curved, so as to provide a plurality of focal lengths for ports 415–419. Unlike the embodiment of FIG. 3, in which $\gamma$ (or equivalently A) is less than zero, in FIG. 4 $\gamma$ (or equivalently A) is greater than zero. For ($\gamma$) greater than zero, the second waveguide coupler 402 provides a relatively long focal length for output port 415, a relatively short focal length for output port 419, and intermediate focal lengths for ports 416, 417, and 418.

Figure 6:
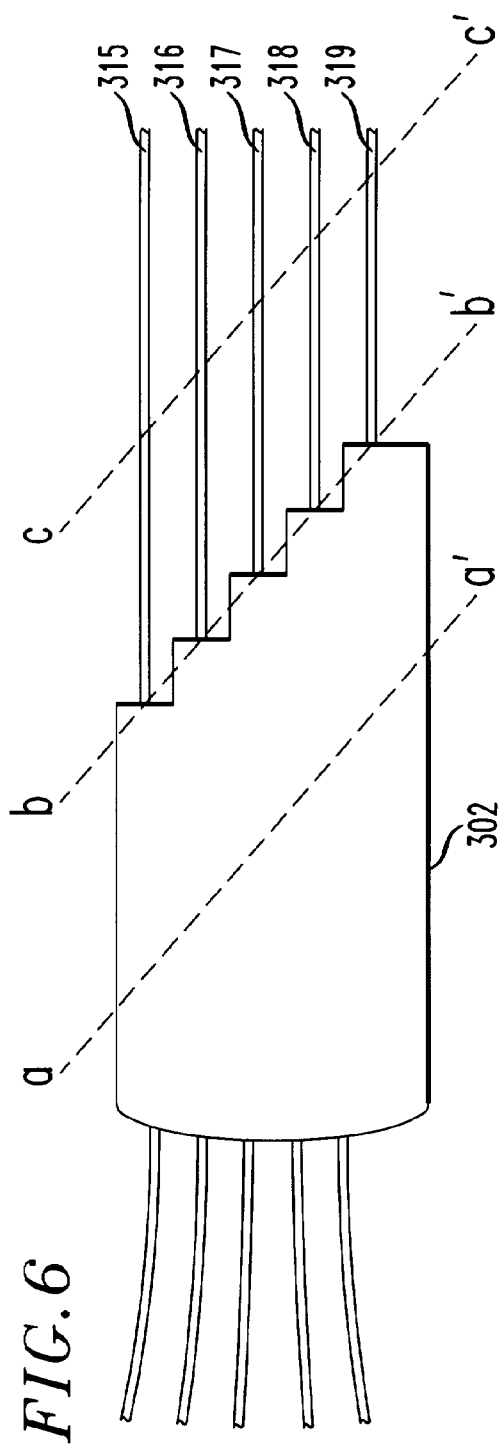
FIG. 6 is an exploded view of the second waveguide coupler shown in FIG. 3.

FIG. 6 is an exploded view of the waveguide coupler 302 of FIG. 3. Note that the focal lengths of output ports 315, 316, 317, 318, and 319 (FIG. 6) have been adjusted to occur substantially along line b-b', so as to enhance a dominant passband 516 (FIG. 5) of a desired order. Line b-b' is substantially coplanar to ports 315–319, and at an angle with respect to the direction of ports 315–319. If the focal lengths of the output ports 315, 316, 317, 318, 319 (FIG. 6) are adjusted to occur substantially along line a-a', a dominant passband 517 (FIG. 5) of a higher order is enhanced. By contrast, if the focal lengths of the output ports 315, 316, 317, 318, 319 (FIG. 6) are adjusted to occur substantially along line c-c', a lower-order dominant passband is enhanced. Line a-a' is substantially parallel to lines b-b' and c-c'. In conclusion, radially adjusting the entrances of the ports in a parabolic-chirped waveguide grating router provides nearly nonchirped performance for all the channels in a specified passband order, with other passband orders out of focus.

What is claimed is:

1. An apparatus for guiding optical signals comprising a first waveguide coupler, a second waveguide coupler having one or more output ports, and a plurality of M waveguides coupled between the first and second waveguide couplers; each of respective M waveguides having a length denoted as L(m), such that the difference in length ($\Delta L$) between any two adjacent waveguides, m and (m−1), is substantially equal to an arbitrary constant plus (A*m) for m=1, . . . , M and A is a non-zero real number;

the output ports each having a focal length related to A, in such a manner that the transmissivity of at least one dominant passband selected from a plurality of passbands is enhanced from at least one input port to at least one output port;

wherein the first output port is coupled to the second waveguide coupler so as to enhance transmissivity of a first dominant passband and the second output port is coupled to the second waveguide coupler so as to enhance transmissivity of a second dominant passband and the focal length of the first output port is adjusted to be less than the focal length of the second output port.

2. An apparatus for guiding optical signals, comprising a first waveguide coupler having one or more input ports, a second waveguide coupler having one or more output ports, and a plurality of M waveguides connected between, the first and second waveguide couplers; each of respective M waveguides having a length denoted as L(m), m denoting a given waveguide out of a total M waveguides, the lengths of respective M waveguides being determined by the mathematical relationship:

$$L(m) = \text{round}\left\{\left[m + \gamma\left(\frac{m - \frac{M+1}{2}}{1 - \frac{M+1}{2}}\right)^2\right]\Delta L \frac{\beta_c}{2\pi}\right\}\frac{2\pi}{\beta_c} + \text{constant}$$

wherein $\gamma$ represents a constant whose value determines the differences in length between each of respective M waveguides, such that a dominant passband is centered at the propagation constant $\beta = \beta_c$, with a passband order of $\Delta L \beta_c / (2\pi)$, and "round" specifying a function that rounds its argument to the nearest or a nearby integer; and one or more output ports are placed at a distance from the M waveguides substantially given by $$R\left[1 + \frac{2\gamma\theta}{\left(\Delta\gamma\left(1 - \frac{M+1}{2}\right)\right)^2 - 2\gamma\theta}\right]$$

wherein R is the radius of the second waveguide coupler, $\Delta\gamma$ is the angle between each of the M waveguides, and $\theta$ is the angle at which the output port enters the second waveguide coupler.

3. A method of guiding optical signals including the steps of:

(a) providing a first waveguide coupler having one or more input ports and a second waveguide coupler having one or more output ports; and (b) coupling a plurality of M waveguides between the first and second waveguide couplers, each of respective M waveguides having a length denoted as L(m), wherein the difference in length ($\Delta L$) between any two adjacent waveguides, m and (m−1), is substantially equal to an arbitrary constant plus (A*m) for each of the waveguides, whereby the length L(m) of the waveguide arms is a monotonically increasing or decreasing function of m; and (c) adjusting the focal length of the second waveguide coupler as a function of A, such that transmissivity of a dominant passband selected from a plurality of passbands is enhanced wherein said output ports are placed at a distance from the M waveguides substantially given by $$R\left[1 + \frac{2\gamma\theta}{\left(\Delta\gamma\left(1 - \frac{M+1}{2}\right)\right)^2 - 2\gamma\theta}\right]$$

wherein R is the radius of the second waveguide coupler, $\Delta\gamma$ is the angle between each of the M waveguides, and $\theta$ is the angle at which the output port enters the second waveguide coupler.

4. The method of claim 3 further including the step of coupling a first output port to the second waveguide coupler in a manner so as to enhance transmissivity of a first dominant passband from an input port to the first output port.

5. The method of claim 4 further including the step of coupling a second output port to the second waveguide coupler in a manner so as to enhance transmissivity, from an input port to the second output port, of a second dominant passband.

* * * * *